United States Patent
Rothrum et al.

(10) Patent No.: US 6,588,681 B2
(45) Date of Patent: Jul. 8, 2003

(54) LIQUID SUPPLY ASSEMBLY

(75) Inventors: Robert J. Rothrum, Coon Rapids, MN (US); Joel A. Vokaty, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 165 days.

(21) Appl. No.: 09/901,410

(22) Filed: Jul. 9, 2001

(65) Prior Publication Data

US 2003/0006310 A1 Jan. 9, 2003

(51) Int. Cl.⁷ .............................. B05B 11/04
(52) U.S. Cl. ...................... 239/328; 239/345
(58) Field of Search .................. 239/323, 328, 239/375–379, 345, 346

(56) References Cited

U.S. PATENT DOCUMENTS

| | | | |
|---|---|---|---|
| 1,722,101 A | | 7/1929 | Little |
| 3,432,104 A | * | 3/1969 | Kaltenbach |
| 4,159,081 A | * | 6/1979 | Demler et al. |
| 4,951,875 A | * | 8/1990 | Devey |
| 5,582,350 A | * | 12/1996 | Kosmyna et al. |

FOREIGN PATENT DOCUMENTS

| | | |
|---|---|---|
| DE | 196 18 514 A1 | 11/1997 |
| GB | 961183 | 6/1964 |
| WO | WO 98/32539 | 7/1998 |
| WO | WO 01/12337 | 2/2001 |

* cited by examiner

Primary Examiner—Lisa A. Douglas
(74) Attorney, Agent, or Firm—William L. Huebsch

(57) ABSTRACT

An assembly for making accurate mixtures of liquid components and feeding that liquid mixture to the inlet port of a sprayer. The assembly includes (1) a container of stiff visually transparent polymeric material comprising a side wall with a frusto conical inner surface, and a bottom wall at the bottom end of the side wall opposite a top end of the side wall that defines an opening into a cavity in the container. A flexible liner positioned within the cavity in the container has an outer surface corresponding in shape to the inner surface of the container, an inner surface defining a cavity in the liner, and an annular lip along the top end of the side wall defining an opening into the cavity in the liner. An indicating sheet of resiliently flexible polymeric material is positioned between the side wall of the container and the flexible liner, conforms in shape to the inner surface of the container, and bears indicia visible through the side wall of the container that indicates the levels to which a plurality of different component liquids can be sequentially poured into the cavity in the flexible liner to achieve a predetermined ratio between the liquids.

14 Claims, 6 Drawing Sheets

LIQUID SUPPLY ASSEMBLY

FIELD OF THE INVENTION

The present invention relates to the liquid supply assemblies that supply mixtures of component liquids to be sprayed (e.g., paint) to liquid spraying devices or spray guns, and in one aspect, to the indicia on such assemblies by which the mixtures of component liquids to be sprayed by such devices are measured in predetermined ratios.

BACKGROUND OF THE INVENTION

Various liquid supply assemblies have been described for supplying mixtures of component liquids to be sprayed to gravity fed liquid (e.g., paint) spraying devices or spray guns, including the supply assembly including a collapsible liner that is described in International Publication Number WO 98/32539 of Jul. 30, 1998, the content whereof is incorporated herein by reference. The liquid supply assembly described in WO 98/32539 includes a container of stiff polymeric material comprising a frusto conical side wall and a bottom wall at a bottom end of the side wall with an opposite top end of the side wall defining an opening into a cavity in the container, and a flexible liner within that cavity, which liner corresponds in shape to an inner surface of the container, and has an annular lip along the top end of the side wall that defines an opening into a cavity in the liner. That liquid supply assembly further includes an adapter assembly comprising a central portion having a through opening that is adapted to engage the inlet port of the gravity fed liquid spraying device, a transverse portion including a peripheral part adapted for engagement within the flexible liner adjacent the top end of the container, and means for sealing the flexible liner around that peripheral part of the adapter assembly. The flexible liner within the cavity in the container can be used as a receptacle for measuring and mixing two or more component liquids for the mixture to be sprayed, and markings or indicia are provided on the side of the container that enable the volume of the contents of the container to be determined, which can facilitate measuring the needed amounts of those component liquids.

Automotive paint companies (e.g., DuPont, PPG, BASF, Sikkens) specify mix ratios for the component liquids in their refinishing materials (e.g., paints, primers, clearcoats), many of which mix ratios are distinctly different, and require accurate measuring of the different component liquids to achieve desired results. The automotive paint companies recommend weighing the component liquids in the mix ratios using an electronic scale. It is estimated, however, that less than 25% of the automobile refinishing shops in the U.S.A. use that method. The component liquids in the mix ratios can be measured to obtain the desired ratio using the appropriate "mix stick", which is a precision metal ruler with various mix ratios printed on it (e.g., 1:1, 2:1, 3:1:1, 4:1:1, 100:50:30, 5:1:2, 100:100:10, etc). The mix stick is stood upright in an appropriate container with vertical sides, and the component liquids are added in the appropriate ratio using marks on the mix stick to determine the amounts of the liquids to be added.

Most automobile refinishing shops, however, are believed to measure the component liquids to obtain the desired mix ratio using disposable mixing cups of stiff visually transparent polymeric material that bear indicia on their side walls indicating the levels to which a plurality of different component liquids should be sequentially poured into the cup to achieve the desired mix ratio between them. U.S. patent application Ser. No. 09/374,794 filed Aug. 16, 1999, describes a liquid supply assembly adapted for use on a gravity fed liquid spraying device that includes that disposable mixing cup by providing (1) an adapter assembly comprising a central portion having a through opening that is adapted to engage the inlet port of the gravity fed liquid spraying device, and a transverse portion including a peripheral part adapted for sealing engagement within the top end of the disposable mixing cup; together with (2) a tapered removable pin (e.g., a pin of the type sometimes called a "push pin") that is inserted through the side wall of the disposable mixing cup adjacent its bottom wall and can be removed to provide vacuum relief for the liquid supply assembly.

While the indicia provided on either the container of the liquid supply assembly described in WO 98/32539 or on the disposable cup of the liquid supply assembly described in U.S. patent application Ser. No. 09/374,794 could be used for making a mixture of two or more component liquids to be sprayed by a gravity fed liquid spraying device, it is not possible to provide on either that container or mixing cup all of the different indicia that might be needed to mix all of the different ratios of different component liquids that might be desired by operators of such gravity fed liquid spraying devices. Thus, several different containers or mixing cups bearing different indicia must be made and provided. We estimate that at least ten different containers or mixing cups would be needed just to properly cover the majority of mix ratios needed for paint component liquids commercially available from DuPont, PPG, BASF, or Sikkens.

DISCLOSURE OF THE INVENTION

The present invention provides a liquid supply assembly for use with liquid spraying devices that, like the liquid supply assemblies described above, provides indicia by which component liquids for mixtures of liquids to be sprayed by such devices are measured to provide predetermined ratios, but which affords conveniently providing indicia that facilitates measuring many more of the different ratios of different component liquids that might be desired by operators of such liquid spraying devices than when such indicia are provided on the containers or mixing cups as described above.

According to the present invention there is provided a liquid supply assembly that, like the liquid supply assembly described in International Publication Number WO 98/32539, comprises (1) a container of stiff visually transparent polymeric material comprising a side wall, and a bottom wall extending across the bottom end of the side wall, the container having an inner surface defining a cavity in the container, and a top end of the side wall defining an opening into the cavity, a portion of the inner surface along the side wall having the shape of a conical frustum and increasing in diameter from the bottom end toward the top end of the side wall; (2) a flexible liner within the cavity in the container, which liner has an outer surface corresponding in shape to the inner surface of the container, an inner surface defining a cavity in the liner, and an annular lip along the top end of the side wall defining an opening into the cavity in the liner; and (3) indicia that provide information about the contents of the container.

Unlike the liquid supply assembly described in International Publication Number WO 98/32539, however, the indicia in the present invention are provided on an indicating sheet of resiliently flexible polymeric material positioned between the side wall of the container and the flexible liner, which indicating sheet conforms in shape to the inner surface of the container along the side wall, is accurately positioned with respect to the liner and the side wall, and bears such indicia so that it is visible through the side wall of the container. That indicia can indicate the levels to which a plurality of different component liquids can be sequentially poured into the cavity in the flexible liner to achieve a predetermined ratio between the component liquids.

The use of the indicating sheet allows a person to prepare any one of many different ratios of different component liquids that might be desired by operators of liquid spraying devices by selecting an appropriate indicating sheet form a set of indicating sheets that together provide the indicia needed for preparing the majority of mix ratios needed for component liquids commercially available from major manufacturers. If different indicia is needed for use in preparing a different mix ratio of component liquids (e.g., an unusual or new paint mixture or the like), a new indicating sheet providing such indicia can be economically made and provided to meet that need.

To use the liquid supply assembly the indicating sheet of resiliently flexible polymeric material is positioned along the inner surface of the container, and the flexible liner is positioned in the container with the indicating sheet between the container and the liner where it will conform in shape to the inner surface of the side wall of the container and where the indicia on the indicting sheet will indicate the levels to which a plurality of different component liquids can be sequentially poured into the cavity in the flexible liner to achieve a predetermined ratio between those liquids for a material to be sprayed. Component liquids are then sequentially poured into the cavity in the liner to achieve a predetermined ratio between the component liquids indicated by the indicia on the indicating sheet, after which the component liquids are thoroughly mixed. The container and flexible liner containing the mixed component liquids can then be attached to a liquid spraying device by an adapter assembly that comprises a central portion having a through opening that is adapted to engage the inlet port of the gravity fed liquid spraying device, a transverse portion including a peripheral part adapted for engagement within the flexible liner adjacent the top end of the container, and means for sealing the flexible liner around that peripheral part of the adapter assembly.

A plurality of indicating sheets of resiliently flexible polymeric material adapted to conform in shape to the inner surface of the container may be provided, each of which indicating sheets has the same physical shape and structure but bears different indicia that, when the indicating sheet is positioned along the inner surface of the container between the container and the liner, will indicate the levels to which a plurality of different component liquids can be sequentially poured into the cavity in the liner to achieve different predetermined ratio between the liquids. A user of the liquid supply assembly will have to selecting an appropriate one of those indicating sheets to be positioned along the side wall of the container to use the assembly.

BRIEF DESCRIPTION OF DRAWING

The present invention will be further described with reference to the accompanying drawing wherein like reference numerals refer to like parts in the several views, and wherein.

DETAILED DESCRIPTION OF THE INVENTION

Figure 6:
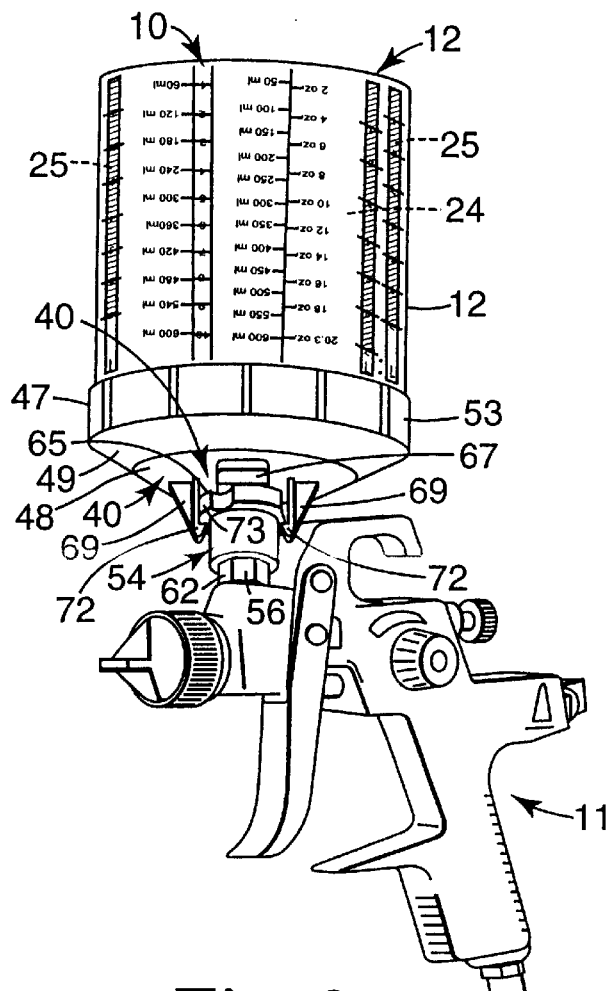
FIG. 6 is a perspective view of the liquid supply assembly of FIG. 1 attached to a spraying device and inverted to the position used for spraying liquid with the spraying device.

Referring now to the drawing there is illustrated a liquid supply assembly according to the present invention generally designated by the reference numeral 10. That liquid supply assembly 10 (as is illustrated in FIG. 6) can be used to supply a mixture of component liquids to be sprayed to a conventional gravity fed liquid spraying device or spray gun 11 (e.g., the spray gun commercially designated NR 95 that is available from Sata, Farbspritzechnik GmbH & Co., Kornwestheim, Germany).

Figure 1:
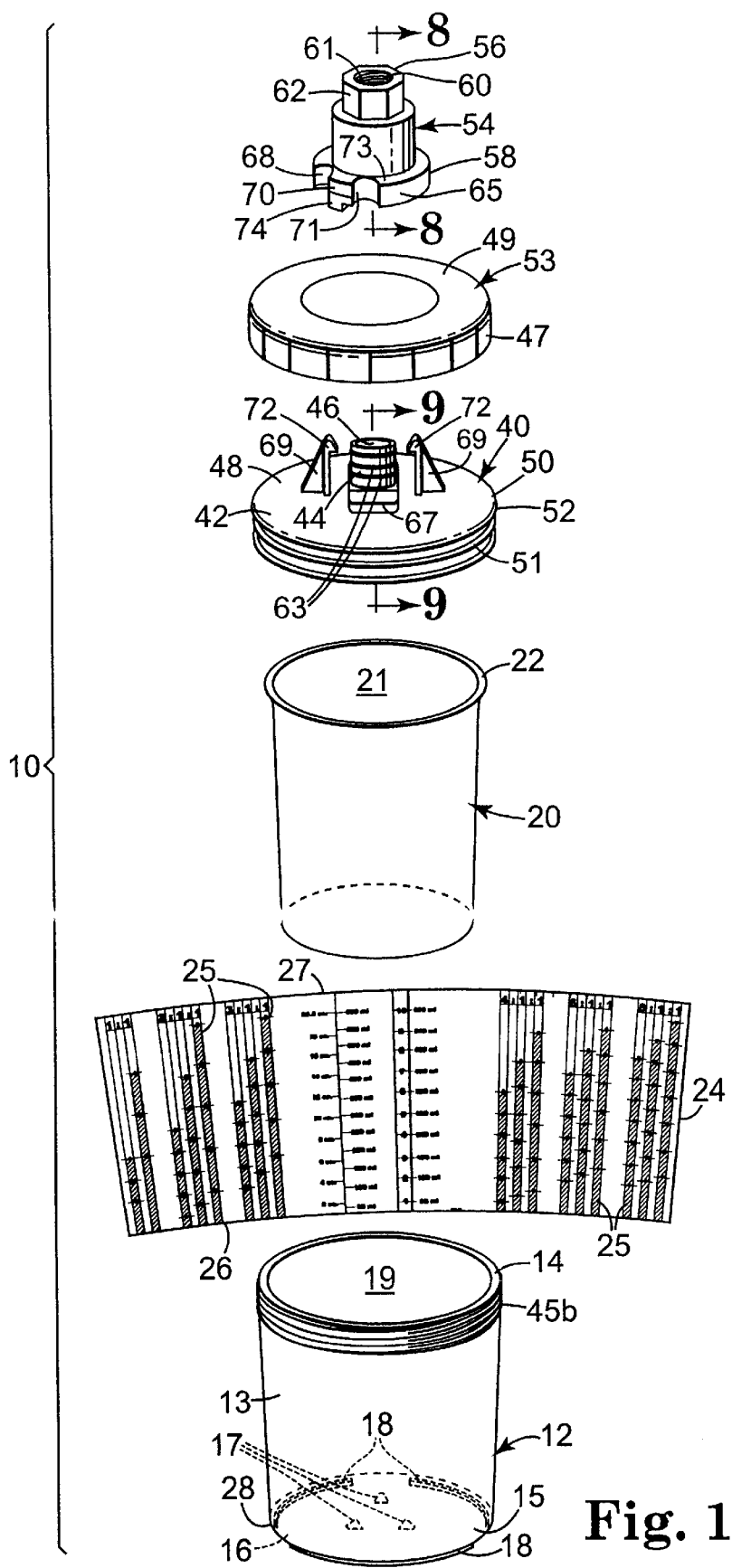
FIG. 1 is an exploded perspective view of a liquid supply assembly according to the present invention.
Figure 3:
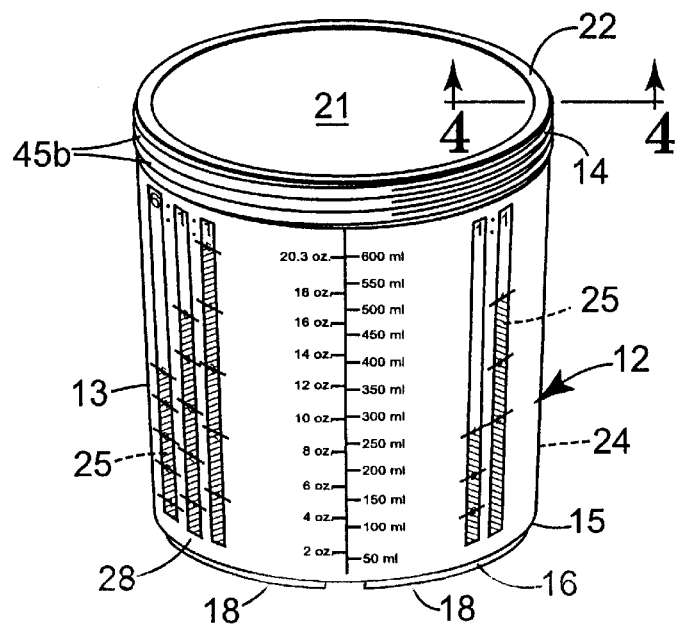
FIG. 3 is an enlarged perspective view of a container, the indicating sheet, and a liner included in the liquid supply assembly of FIG. 1 that are assembled together with the liner within the container and the indicating sheet between the liner and the container so that the indicating sheet can be used to determine a desired ratio of different component liquids poured into the liner.
Figure 4:
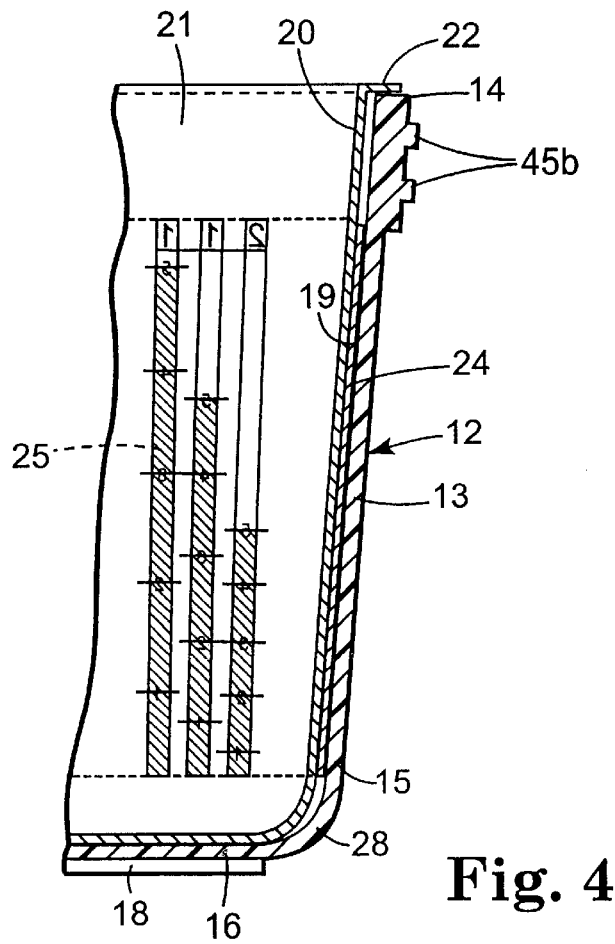
FIG. 4 is an enlarged fragmentary sectional view taken approximately along section line 4—4 of FIG. 3.

As is best seen in FIGS. 1, 3, and 4, the liquid supply assembly 10 includes a container 12 of stiff visually transparent polymeric material (e.g., injection molded of clarified polypropylene to have about 0.047 inch or 1.2 mm thick walls). The container 12 comprises a side wall 13 having top and bottom ends 14 and 15, and a bottom wall 16 extending across the bottom end 15 of the side wall 13 in which are formed through vacuum preventing openings 17 and from which project a circle of three arcuate ridges 18 by which the container 12 can be supported on a horizontal surface. The top end 14 of the side wall 13 defines an opening into a cavity in the container 12 defined by its inner surface 19. A portion of the inner surface 19 of the container 12 along the side wall 13 has the shape of a conical frustum, is called a frusto conical surface herein, and increases in diameter from the bottom end 15 toward the top end 14 of the side wall 13 (e.g., the inner surface 19 has a diameter of about 3.6 inch or 91.6 mm diameter at the end of that frusto conical inner surface adjacent the bottom end 15, with that portion of the frusto conical inner surface tapering outwardly at about 2.87 degrees and having an axial height of about 3.86 inch or 90.8 mm).

The liquid supply assembly 10 further includes a stiff but thin and flexible liquid impervious collapsible cup-like liner 20 adapted to be positioned within the cavity in the container 12 (e.g., vacuum formed from a sheet of low density polyethylene to have a side wall about 0.004 to 0.01 inch or 0.1 to 0.25 mm thick and a bottom wall about 0.001 inch or 0.25 mm thick or thicker so that the bottom wall tends to stay generally planer as the side wall collapses), which liner 20 has side and bottom walls providing an outer surface that corresponds in shape to the inner surface 19 of the container 12, an inner surface 21 defining a cavity in the liner 20, and an annular radially outwardly projecting lip or flange 22 along the top end 14 of the side wall 13 defining an opening into the cavity in the liner 20.

The liquid supply assembly 10 also includes an indicating sheet 24 of resiliently flexible polymeric material (e.g., of 0.0035 inch or 0.0089 cm thick polyester film) having indicia 25 printed on it. The indicating sheet 24 is planer when made (see FIGS. 1 and 2) but can be resiliently curved to be positioned in and conform to the frusto conical shape of the inner surface 19 of the container 12 along its side wall 13 (see FIGS. 3 and 4) whereupon the indicia 25 will be visible through the visually transparent side wall 13 of the container 12. Parts of that indicia 25 indicate the levels to which a plurality of different component liquids can be sequentially poured into the cavity 21 in the flexible liner 20 (when the liner is also within the container 12 as in FIGS. 3 and 4) to achieve different predetermined ratios between the component liquids, whereas other parts of that indicia 25 indicate the total amount of liquid contained in the flexible liner 20. The side wall 13, indicating sheet 24, and liner 20 are sufficiently transparent or translucent to afford seeing the level of liquid in the liner 20 through them when the indicating sheet 24 and the liner 20 are in the container 12 which allows a person to add component liquids to the cavity in the liner 20 to the required or desired levels indicated by the indicia 25.

Figure 2:
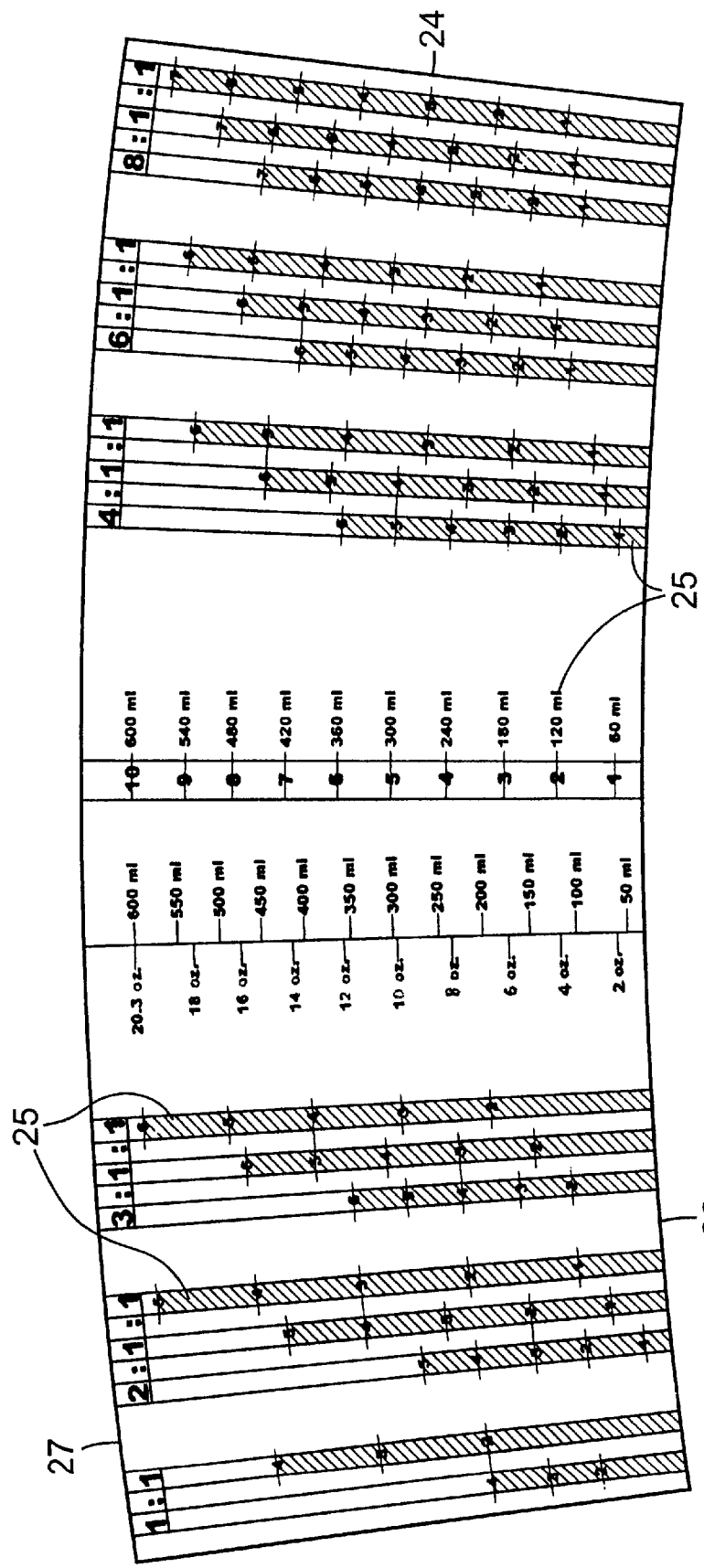
FIG. 2 is an enlarged view of an indicating sheet included in the liquid supply assembly of FIG. 1.

The flexible indicating sheet 24 removed from the container 12 and disposed with each of its surfaces in one plane is illustrated in FIGS. 1 and 2. The indicating sheet 24 can be made from a sheet of the polymeric material commercially available under the designation "Transparency Film for Copiers", "PP2500" from Minnesota Mining and Manufacturing Company, St Paul, Minn. The indicating sheet 24 can be printed with the indicia 25 by preparing a master sheet bearing the indicia, and then replicating the indicia 25 on the indicating sheet using an office copying machine. The indicating sheet 24 can then be die cut to have the shape indicated in FIGS. 1 and 2 which includes a concave bottom edge 26 with a radius (e.g., 35 inch or 89 cm radius) such that the bottom edge 26 can be positioned along a plane normal to the axis of the container 12 when the indicating sheet 24 is disposed along the inner surface 19 of the side wall 13 of the container 12. The top edge 27 of the indicating sheet 24 has a radius that is the same as that of its bottom edge 26. The length of the indicating sheet 24 is adapted to go only partially around the inner surface 19 of the container 12 (i.e., preferably more than halfway around and less than fully around, such as, for example, about 75% the distance around that inner surface 19) for reasons to be explained later, and the indicating sheet 24 has ends disposed so that they will be generally parallel when the indicating sheet 24 is positioned along that inner surface 19. Close tolerance between the bottom edge 26 of the indicating sheet 24 and the location of the indicia 25 is critical to obtaining accurate mixtures in the liquid supply assembly 10, but can easily be achieved with conventional label making industry processes.

Accurate registration between the indicating sheet 24 and the liner 20 is obtained in that the container 12 further includes an annular portion 28 having a concave inner surface between its side wall 13 and its bottom wall 16. When the indicating sheet 24 and the liner are positioned within the container 12 as indicated below, the lower edge 26 of the indicating sheet 24 will stop and be supported at the juncture between that annular portion 28 and the side wall 13 to accurately align the indicia 25 on the indicating sheet 24 with the inner surface of the liner 20, which liner 20 is in turn accurately aligned with the inner surface 19 of the container 12 by conforming to and being supported along its inner surface 19. To assemble the container 12, indicating sheet 24 and liner 20, the indicating sheet 24 is first positioned in the cavity in the container 12, which will typically result in at least part of the sheet 24 being spaced from the side wall 13 of the container and part of its lower edge 26 being along the bottom wall 16 of the container. The liner 20 is then inserted into the cavity in the contain 12. This insertion will cause the indicating sheet to move to a position along the frusto conical surface on the side wall 13 of the container, apparently because of the movement of air around the sides of the liner 20 being inserted in and out of the openings 17 and/or because of pressure applied to the indicating sheet 24 by the outer surface of the liner 20. At least parts of the lower edge 26 of the indicating sheet 24 may then be above the juncture between the annular portion 28 and the side wall 13, however the indicating sheet 24 can easily be moved to that position with its lower edge 26 stopped and supported at the juncture between the annular portion 28 and the side wall 13 by lightly tapping the bottom surface of the container 12 against a horizontal surface. The lower edge 26 of the indicating sheet 24 will then move to, stop and be supported at that juncture apparently because for the indicating sheet 24 to move lower in the container 12 would require a portion of the then frusto conical shaped indicating sheet 24 adjacent its lower edge 26 to flex inwardly with respect to the rest of the indicating sheet 24. This alignment of the bottom edge 26 of the indicating sheet with at the juncture between the annular portion 28 and the side wall 13 is believed to be facilitated by the ease with which the indicating sheet 24 slips along the surfaces of the container 12 and liner 20 (i.e., the printed "Transparency Film for Copiers" slips very easily on the polyolefins from which the container 12 and the liner 20 are made). It has been found that this alignment of the bottom edge 26 of the indicating sheet with at the juncture between the annular portion 28 and the side wall 13 will occur reliably when the length of the indicating sheet 24 is adapted to go less than about 80% the distance around the inner surface 19 of the container 12, however the end portions of the indicating sheet 24 will not always properly align at that juncture when the length of the indicating sheet 24 is adapted to go much more than about 80% the distance around the inner surface 19 of the container 12.

Figure 5:
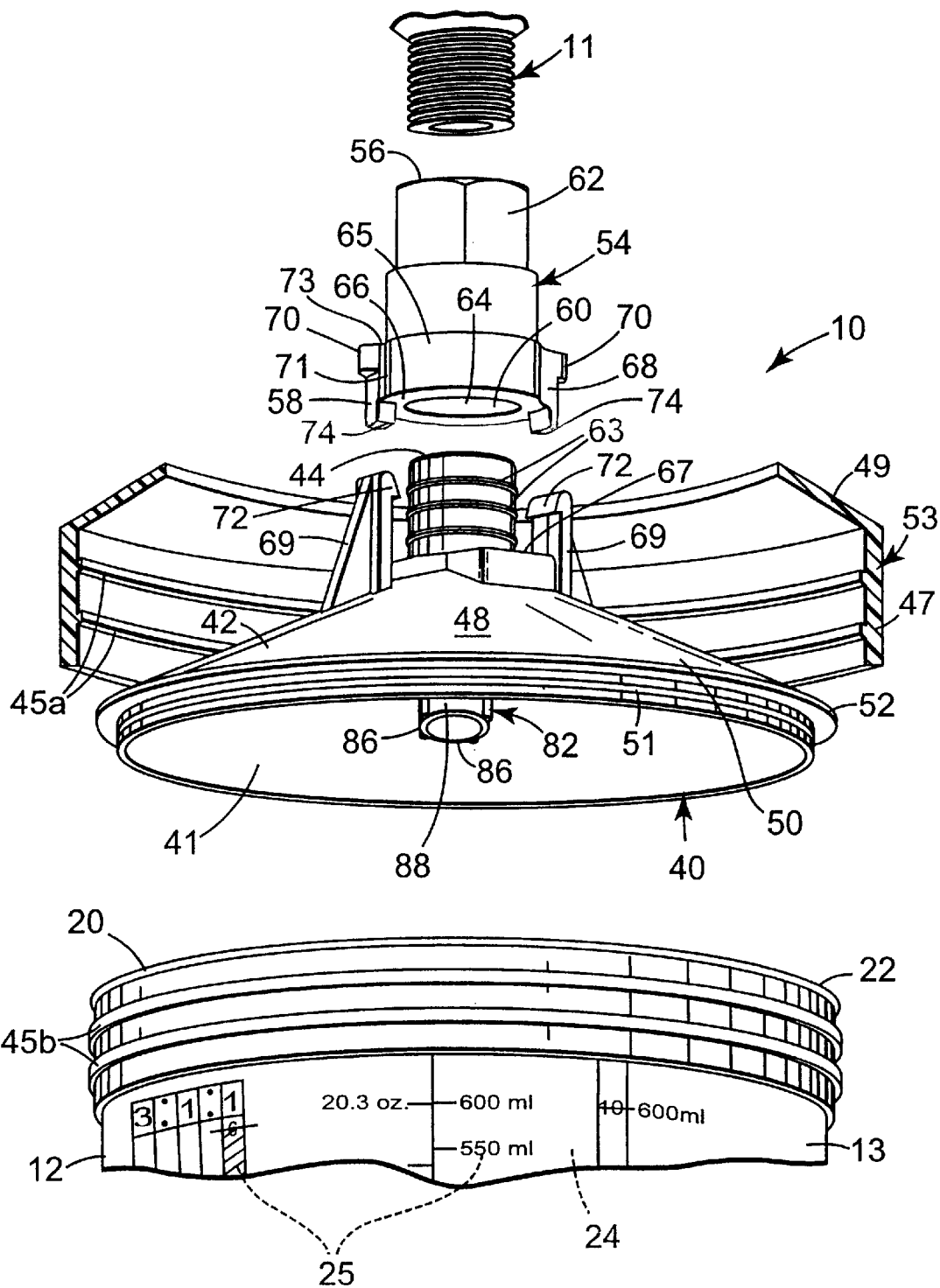
FIG. 5 is an enlarged fragmentary exploded perspective view of the liquid supply assembly of FIG. 1, partially in section, together with a fragment of a spraying device or spray gun to which the liquid supply assembly is adapted to be attached.
Figure 9:
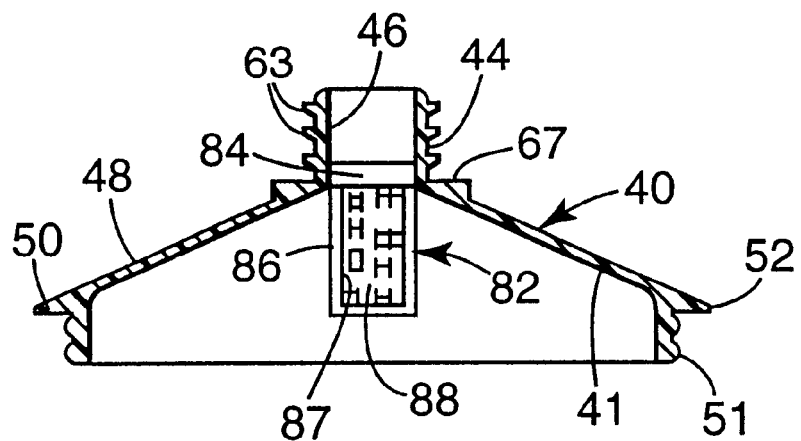
FIG. 9 is an enlarged sectional view taken approximately along section line 9—9 of FIG. 1.

The liquid supply assembly 10 also includes a first adapter 40, (see FIGS. 1, 5, and 9) preferably molded of polymeric material (e.g., polyethylene), having opposite inner and outer major surfaces 41 and 42. The first adapter 40 comprises a central generally cylindrical portion 44 having a through opening 46 and a transverse portion 48 including a peripheral part 50. The peripheral part 50 of the transverse portion 48 includes a cylindrical axial projection 51 having ridges around its outer surface that fits closely within a portion of the flexible liner 20 adjacent its lip 22, and has a radially projecting flange 52 that, when the axial projection 51 is within the liner 20 and the liner 20 is within the container 12, is positioned along the side of the lip 22 on the liner 20 opposite the top end 14 of the container 12.

The liquid supply assembly 10 also includes a sealing ring 53 having a central opening through which the central part of first adapter 40 can project, a generally radially inwardly projecting portion 49 shaped to overlay and contact the radially projecting flange 52 along the outer surface 42 of the first adapter 40, and an axially projecting portion 47 having square threads 45a along its inner surface. Those square threads 45a on the sealing ring 53 can be engaged with mating threads 45b around the outer surface of the container 12 adjacent its top end 14 to clamp the portion 49 of the ring 53 against the outer surface 42 of the transverse portion 48 and thereby the lip 22 of the liner 20 between the container 12 and the first adapter 40 to seal the first adapter 40 to the end of the liner 20.

Figure 7:
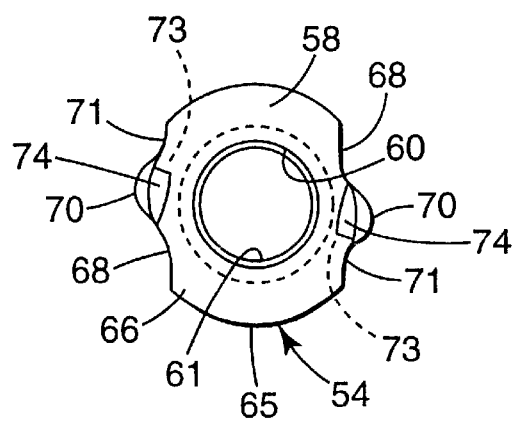
FIG. 7 is an end view of a second adapter included in the liquid supply assembly of FIG. 1.
Figure 8:
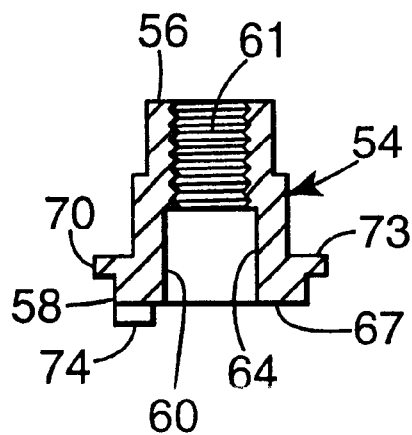
FIG. 8 is an enlarged sectional view taken approximately along section line 8—8 of FIG. 1.

A second adapter 54 (see FIGS. 1, 5, 7, and 8), also included in the liquid supply assembly 10, is preferably of metal (e.g., aluminum), has first and second spaced end portions 56 and 58, and has a through opening 60 extending through those end portions 56 and 58. The first end portion 56 of the second adapter 54 has internal threads 61 and six flatted wrench engageable surface portions 62 around its periphery, thereby being adapted to be releasably engaged with external threads on the inlet port of the gravity feed spray gun 11. Instead of internal threads 61, the first end portion 56 could alternatively, have any shape needed to properly engage a spray gun, such as external threads (not shown). The first adapter 40 and the second end portion 58 of the second adapter 54 have connector parts that are adapted for releasable liquid tight engagement with their through openings 46 and 60 in communication. Those connector parts include axially spaced radially outwardly projecting sealing rings 63 along the outer surface of the cylindrical portion 44 of the first adapter 40, and a cylindrical inner surface 64 of the second adapter 54 that defines a cylindrical bore opening through the end of the second adapter 54 opposite the threads 61. That bore is adapted to receive the cylindrical portion 44 of the of the first adapter 40 in an engaged position with the sealing rings 63 in slightly compressed liquid tight engagement with the inner surface 64 defining the bore and with an end surface 66 on a collar 65 around the second end portion 58 of the second adapter 54 abutting a boss 67 in the first adapter 40 around the cylindrical portion 44. The collar 65 has major cylindrically concave recesses 68 along opposite sides of its periphery (see FIG. 7) adapted to pass the distal ends of hook members 69 projecting from the transverse portion 48 of the first adapter 40 on opposite sides of the cylindrical portion 44 when the cylindrical portion 44 is pressed axially into the bore with the first and second adapters 40 and 54 in a first relative position at which the hook members 69 are aligned with the major recesses 68 in the collar 65. The first and second adapters 40 and 54 can then be rotated relative to each other to a second relative position to cause the resiliently flexible projecting hook members 69 to be deflected outwardly by, and to move around, cylindrically convex cam lobes 70 projecting radially outwardly on corresponding sides of the major recesses 68 until the projecting hook members 69 are positioned in minor cylindrically concave recesses 71 in the collar 65 at which opposed inwardly projecting lips 72 on the distal ends of the projecting hook members 69 are engaged over a surface 73 of the collar 65 adjacent the first end 56 of the second adapter 54. Lugs 74 projecting axially past the end surface 66 of the collar 65 are adapted to move between positions engaging sides of the boss 67 on the first adapter 40 when the cylindrical portion 44 is in its engaged position in the bore defined by the inner surface 64, thereby limiting relative movement between the adapters 40 and 54 to movement to and between those first and second relative positions.

The combination 10 can also include a removable filter assembly 82 (see FIGS. 2 and 3) of a known commercially available type (e.g., the filter commercially designated "paint filter kit" that is commercially available from Standard Color, St. Paul, Minn.). The filter assembly 82 includes a stiff polymeric frame comprising a cylindrical outlet portion 84 having a cylindrical outer surface frictionally engaged within the inner surface defining the through opening 46 in the central portion 44, which outlet portion 84 has a through opening. The frame of the filter assembly 82 further includes an inlet portion 86 projecting from the inner surface 41 of the transverse portion 48 of the first adapter 40. The inlet portion 86 has four axially extending rectangular inlet passageways 87 spaced around its periphery that communicate with the through opening in the outlet portion 84, and includes a filter screen 88 extending across the inner ends of those inlet passageways 87.

A method according to the present invention for providing a supply of mixed component liquids to be sprayed by the gravity fed liquid spraying device 11 includes positioning the indicating sheet 24 along the inner surface of the side wall 13 of the container 12 with its lower edge 26 adjacent the bottom end 15 of the container 12 and the indicia 25 facing outwardly. The flexible liner 20 is then positioned within the cavity in the container 12 so that the indicator sheet 24 moves to a position between the side wall 13 of the container 12 and the flexible liner 20 as is described above. The bottom end 15 of the container 12 is lightly tapped on a horizontal surface so that the lower edge 26 of the indicator sheet 24 moves to a position along and supported at the juncture between that annular portion 28 and the side wall 13 of the container to accurately align the indicia 25 on the indicating sheet 24 with the inner surface of the liner 20. Different component liquids are then sequentially poured into the cavity in the liner 20 to levels indicated by the indicia 25 on the indicating sheet 25 to achieve a desired predetermined ratio between the component liquids, and the component liquids are well mixed in the liner 20. The cylindrical axial projection 51 of the first adapter 40 is then inserted into the portion of the flexible liner 20 adjacent its lip 22 until the radially projecting flange 52 is positioned along the side of the lip 22 on the liner 20 opposite the top end 14 of the container 12. The threads 45a on the axially projecting portion 47 of the ring 53 are then engaged with the threads 45b around the container 12 so that the portion 49 of the ring 53 is clamped against the transverse portion 48 of the first adapter 40 to seal the lip 22 of the liner 20 between the container 12 and the first adapter 40 and thereby seal the first adapter 40 to the end of the liner 20.

The first end 56 of the second adapter 54 is engaged with the inlet port of the liquid spraying device 11 (if this has not already been done); The releasably engagable parts of the adapters 40 and 54 are engaged as described above (this being done with the container 12 supported on its bottom wall 16 and the spraying device 11 inverted); and the spraying device 11 is positioned as illustrated in FIG. 6 so that the bottom wall 16 of the container 12 is uppermost to feed the mixed component liquids in the liner 20 to the spraying device 11 through the filter assembly 82 and the openings 46 and 60 in the adapters 40 and 54, whereupon the liner 20 will collapse as that liquid is sprayed out. After the desired amount of mixed liquid is sprayed out, the parts of the adapters 40 and 54 can be disengaged, and the first adapter 40 and the collapsed liner 20 (i.e., the side wall of the liner 20 will have collapsed axially while its end wall will have remained generally circular) with any remaining liquid in the collapsed liner 20 can be removed from the container 12 and discarded, leaving only the second adapter 54 and spraying device 11 that need to be cleaned.

In addition to the indicating sheet 24, a plurality of indicating sheets of resiliently flexible polymeric material adapted to conform in shape to the inner surface of the container 12 may be provided, each of which additional indicating sheets has the same physical shape and structure as the sheet 24 but bears different indicia that, when the indicating sheet is positioned along the inner surface 19 of the container 12, will indicate the levels to which a plurality of different component liquids can be sequentially poured into the cavity in the flexible liner 20 to achieve different predetermined ratio between the liquids. A user of the liquid supply assembly 10 will then have to selecting an appropriate one of those indicating sheets to be positioned along the side wall of the container 12 to use the assembly 10.

The present invention has now been described with reference to one embodiment thereof. It will be apparent to those skilled in the art that many changes can be made in the embodiment described without departing from the scope of the present invention. For example, the liquid supply assembly 10 could be adapted for use with spraying devices that siphon liquid from a supply of liquid. Also, the container 12, liner 20 and the indicating sheet 24 could be assembled as described above and used as a mixing cup in which component liquids are measured and mixed, and from which that mixture is then poured into a liquid supply container for a spraying device. The component liquids measured and mixed in the liquid supply assembly 10 could be of any type, not limited to the component liquids for paint. A slight axially inwardly projecting lip (e.g., a lip 0.005 inch or 0.01 cm high) might be provided at the juncture between the annular portion 28 and the side wall 13 of the container 12 to help locate the lower edge 26 of the indicating sheet 24. Also, the indicating sheet 24 might be made to extend entirely around the inner surface 19 of the container 12 and to have ends that interlock (e.g., with a tab projecting from one end and an opening through the other end that receives that tab) so that the lower edge of the indicating sheet forms a complete circle and will be supported at the juncture between the annular portion 28 and the side wall 13 with or without a projecting lip of the type described above. Any of a number of different types of connectors can be used between the adapters 40 and 54, or no connector at all need be used between the adapters, the adapters being combined into one structure attaching the liquid supply assembly to a spraying device. Thus, the scope of the present invention should not be limited to the structures and methods described in this application, but only by the structures and methods described by the language of the claims and the equivalents thereof.

What is claimed is:

1. A liquid supply assembly for use with a liquid spraying device, the supply assembly comprising:

a container of stiff visually transparent polymeric material comprising a side wall having top and bottom ends, and a bottom wall extending across the bottom end of said side wall, said container having an inner surface defining a cavity in said container, and said top end of said side wall defining an opening into said cavity, a portion of said inner surface along said side wall having the shape of a conical frustum and increasing in diameter from said bottom end toward said top end of said side wall;

a flexible liner within the cavity in said container, said liner having an outer surface corresponding in shape to the inner surface of said container, an inner surface defining a cavity in said liner, and an annular lip along the top end of said side wall defining an opening into the cavity in said liner; and an indicating sheet of resiliently flexible polymeric material between said side wall of said container and said flexible liner, said indicating sheet conforming in shape to the inner surface of said container along said side wall and bearing indicia visible through the side wall of said container indicating the levels to which a plurality of different liquids can be sequentially poured into the cavity in the flexible liner to achieve a predetermined ratio between the liquids.

2. An assembly according to claim 1 wherein said container further includes an annular portion having a concave inner surface between said between side wall and said bottom wall, and said sheet has an edge supported at the juncture between said annular portion and said side wall to accurately align the indicia on the sheet with the inner surface of the liner.

3. An assembly according to claim 1 further including an adapter assembly comprising a central portion having a through opening and being adapted to engage the inlet port of a liquid spraying device, a transverse portion including a peripheral part adapted for engagement within said flexible liner adjacent said top end of said container, and means for sealing the flexible liner around said peripheral part of the adapter assembly.

4. An assembly according to claim 1 wherein said indicating sheet is of polyester and has a thickness in the range of 0.0025 to 0.0045 inch or 0.0064 to 0.0114 cm.

5. A method for providing a supply of mixed component liquids for a liquid spraying device, said method comprising the steps of:

providing a container of stiff visually transparent polymeric material comprising a side wall having top and bottom ends, and a bottom wall extending across the bottom end of the side wall, the container having an inner surface defining a cavity in the container, and the top end of the side wall defining an opening into the cavity, a portion of the inner surface along the side wall having the shape of a conical frustum and increasing in diameter from the bottom end toward the top end of the side wall;

providing a flexible liner having an outer surface corresponding in shape to the inner surface of the container, an inner surface defining a cavity in the liner, and an annular lip adapted to be positioned along the top end of the side wall of the container when the outer surface of the liner is along the inner surface of the container, said annular lip defining an opening into the cavity in the liner;

providing an indicating sheet of resiliently flexible polymeric material adapted to conform in shape to the inner surface of said container and bearing indicia that when the sheet is positioned along the inner surface of the container will indicate the levels to which a plurality of different liquids can be sequentially poured into the cavity in the flexible liner to achieve a predetermined ratio between the liquids;

positioning the indicating sheet in the cavity along the side wall of the container;

positioning the liner within the cavity in the container so that the indicating sheet is between the liner and the side wall of the container; and sequentially pouring the component liquids into the cavity in the liner to levels indicated by indicia on the indicating sheet to achieve a predetermined ratio between the component liquids.

6. A method according to claim 5 wherein the container further includes an annular portion having a concave inner surface between said side wall and said bottom wall, said indicating sheet has a length adapted to extend less than the entire distance around the inner surface of the container, said step of positioning the indicating sheet is done prior to said step of positioning the liner whereupon said indicating sheet will move to a position along the inner surface of the side wall of the container, and said method includes the further step of tapping the bottom wall of the container on a surface after said steps of positioning the indicating sheet and positioning the liner to position and support a lower edge of the indicating sheet at the juncture between the annular portion and the side wall to accurately align the indicia on the sheet with the inner surface of the liner.

7. A method according to claim 5 further including the steps of:
providing a plurality of the indicating sheets of resiliently flexible polymeric material adapted to conform in shape to the inner surface of the container, which indicating sheets bear different indicia that when the sheet is positioned along the inner surface of the container will indicate the levels to which a plurality of different liquids can be sequentially poured into the cavity in the flexible liner to achieve different predetermined ratio between the liquids; and
selecting an appropriate one of said indicating sheets for said step of positioning the indicating sheet in the cavity along the side wall of the container.

8. A method according to claim 5 further including the steps of:
providing an adapter assembly comprising a central portion having a through opening and being adapted to engage the inlet port of the gravity fed liquid spraying device, a transverse portion including a peripheral part adapted for engagement within the flexible liner adjacent the top end of the container, and means for sealing the flexible liner around the peripheral part of the adapter assembly;
engaging the adapter assembly with the inlet port of the liquid spraying device;
engaging the peripheral part of the adapter assembly within the flexible liner adjacent the top end of the container;
sealing the flexible liner around the peripheral part of the adapter assembly; and
positioning the spraying device so that the bottom wall of the container is uppermost to feed the liquid in the flexible liner to the spraying device through the opening in the adapter assembly.

9. A combination for use in making a liquid supply assembly for use with a liquid spraying device, said combination comprising:
a container of stiff visually transparent polymeric material comprising a side wall having top and bottom ends, and a bottom wall extending across the bottom end of said side wall, said container having an inner surface defining a cavity in said container, and said top end of said side wall defining an opening into said cavity, a portion of said inner surface along said side wall having the shape of a conical frustum and increasing in diameter from said bottom end toward said top end of said side wall;
a flexible liner adapted to be positioned within the cavity in said container, said liner having an outer surface corresponding in shape to the inner surface of said container, an inner surface defining a cavity in said liner, and an annular lip along the top end of said side wall defining an opening into the cavity in said liner; and
a plurality of indicating sheets of resiliently flexible polymeric material, each adapted to be positioned between said side wall of said container and said flexible liner when said flexible liner is in said container, said indicating sheet being adapted to conform in shape to the inner surface of said container and bearing indicia then visible through the side wall of said container indicating the levels to which a plurality of different liquids can be sequentially poured into the cavity in the flexible liner to achieve a predetermined ratio between the liquids;
said indicating sheets bearing different indicia that when each indicating sheet is positioned along the inner surface of the container will indicate the levels to which a plurality of different liquids can be sequentially poured into the cavity in the flexible liner to achieve different predetermined ratios between the liquids.

10. A combination according to claim 9 wherein said container further includes an annular portion having a concave inner surface between said between side wall and said bottom wall, and said sheets each have an edge adapted to be supported at the juncture between annular portion and said side wall to accurately align the indicia on the sheet with the inner surface of the liner.

11. A combination according to claim 9 further including an adapter assembly comprising a central portion having a through opening and being adapted to engage the inlet port of the liquid spraying device, a transverse portion including a peripheral part adapted for engagement within said flexible liner adjacent said top end of said container, and means adapted for sealing the flexible liner around said peripheral part of the adapter assembly.

12. A combination according to claim 9 wherein said indicating sheet is of polyester and has a thickness in the range of 0.0025 to 0.0045 inch or 0.0064 to 0.0114 cm.

13. An indicating sheet adapted to be used in a liquid supply assembly for use with a liquid spraying device, which supply assembly comprises a container of stiff visually transparent polymeric material comprising a side wall having top and bottom ends, and a bottom wall extending across the bottom end of said side wall, said container having an inner surface defining a cavity in said container, and said top end of said side wall defining an opening into said cavity, a portion of said inner surface along said side wall having the shape of a conical frustum and increasing in diameter from said bottom end toward said top end of said side wall; and a flexible liner adapted to be positioned within the cavity in said container, said liner having an outer surface corresponding in shape to the inner surface of said container, an inner surface defining a cavity in said liner, and an annular lip adapted to be positioned along the top end of said side wall and defining an opening into the cavity in said liner;
said indicating sheet being of resiliently flexible polymeric material, and being adapted to be positioned between said side wall of said container and said flexible liner, said indicating sheet being adapted to conform in shape to the inner surface of said container along said side wall and having a lower edge adapted to be positioned in a plane normal to the axis of the inner surface of the container when the indicating sheet is in the container and to be supported at a predetermined position in the container, and said indicating sheet bearing indicia that can be visible through the side wall of said container indicating the levels to which a plurality of different liquids can be sequentially poured into the cavity in the flexible liner to achieve a predetermined ratio between the liquids.

14. An indicating sheet according to claim 13 wherein said indicating sheet has a length adapted to extend less than the entire distance around the inner surface of the container, is of polyester, has a thickness in the range of 0.0025 to 0.0045 inch or 0.0064 to 0.0114 cm, and slips easily along surfaces of the container and the liner.

* * * * *